United States Patent [19]
Hendriks

[11] Patent Number: 5,228,572
[45] Date of Patent: Jul. 20, 1993

[54] EFFICIENT STRAND PACKAGE WITH HEXAGONAL CROSS-SECTION

[75] Inventor: Ivo G. Hendriks, Overpelt, Belgium
[73] Assignee: Teepak, Inc., Westchester, Ill.
[21] Appl. No.: 907,007
[22] Filed: Jul. 1, 1992

Related U.S. Application Data

[63] Continuation-in-part of Ser. No. 696,436, May 6, 1991, Pat. No. 5,137,153.

[51] Int. Cl.$^5$ .............................................. B65D 85/20
[52] U.S. Cl. .................................. 206/443; 206/499; 206/802
[58] Field of Search ............... 206/427, 443, 802, 499; 53/444, 447, 412

[56] References Cited

U.S. PATENT DOCUMENTS

| | | | |
|---|---|---|---|
| 1,458,236 | 6/1923 | Morey et al. | |
| 2,730,259 | 1/1956 | Frick | 217/43 |
| 3,206,020 | 9/1965 | Billingsley et al. | 206/65 |
| 3,220,583 | 11/1965 | Robertson | 214/152 |
| 3,471,305 | 10/1969 | Marbach | 99/176 |
| 3,616,989 | 11/1971 | Martinek et al. | 229/32 |
| 3,764,351 | 10/1973 | Whittington et al. | 206/46 F |
| 3,971,187 | 7/1976 | McNeill et al. | 53/21 FC |
| 4,295,563 | 10/1981 | Becker et al. | 206/205 |
| 4,796,754 | 1/1989 | Chaussadas et al. | 206/427 |
| 4,817,797 | 4/1989 | Hamelin | 206/427 |
| 5,137,153 | 8/1992 | Hendricks | 206/443 |

FOREIGN PATENT DOCUMENTS 2019948 11/1971 Fed. Rep. of Germany.
2283063 3/1976 France.
191195 11/1937 Switzerland.

Primary Examiner—Steven N. Meyers
Assistant Examiner—Thomas P. Hilliard
Attorney, Agent, or Firm—Michael L. Dunn

[57] ABSTRACT

A package comprising, shirred, essentially cylindrically shaped, food casing strands, each of which has a strand diameter D. The strands are oriented in the package in such a way that longitudinal axes of the strands are parallel, external surfaces of the strands contact external surfaces of adjacent strands and ends of the strands terminate in approximately the same plane, which plane is perpendicular to the longitudinal axes of the strands. The strands are further oriented so that lines passing perpendicularly through the central axes of strands located proximate the external surface of the package intersect to form a hexagon in a plane perpendicular to the longitudinal axes. Sides of the hexagon have side lengths such that the lengths vary by no more than one D from each other. Strands, internally within the package, i.e. which would not have an exteriorly exposed surface if all package wraps were removed, contact six adjacent strands. The package usually consists essentially of, n rows of strands and an external package retainer, usually a package wrap. Preferably each of the lines forming the hexagon passes through the central axes of either an equal number of strands or a number of strands which do not vary by more than one. Preferably, the package according to the present invention has an odd number of rows n, which is a number of 5 to 15.

7 Claims, 5 Drawing Sheets

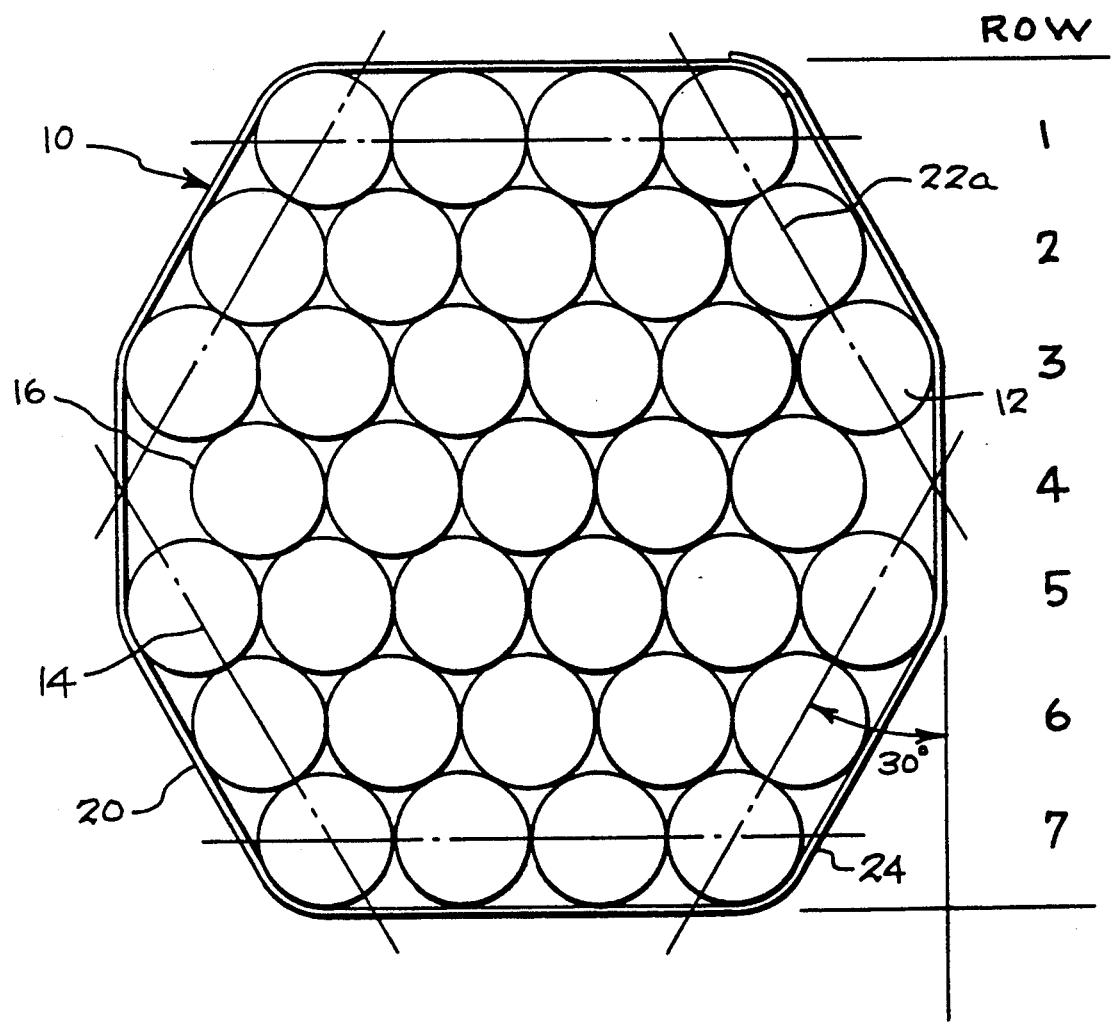

EFFICIENT STRAND PACKAGE WITH HEXAGONAL CROSS-SECTION

BACKGROUND OF THE INVENTION

This is a continuation-in-part of U.S. patent application Ser. No. 07/696,436 filed May 6, 1991, now U.S. Pat. No. 5,137,153.

This invention relates to packaging for shirred food casing strands. Food casings are used for packaging food products, especially meats such as sausages, but also for other food products, such as cheeses. When delivered to a meat packer, such strands are commonly in shirred form, i.e., folded in the form of a cylindrical strand, usually containing from 50 to 125 units of length of unshirred casing per unit length of shirred strand. When such casings are shirred, they are packaged for delivery to the meat packer, to protect the strand from contamination, accidental deshirring (unfolding), crushing, or strand breakage (i.e., breaking or deshirring of the strand between the ends of the strand such that the strand loses coherency and is no longer self supporting in folded form).

Several problems are encountered in prior art strand packaging. For example, such packaging tends not to pack the strands in the most space efficient organization; the strands tend to need significant external support; and protection, e.g., in the form of corrugated boxes; the strands do not protect each other from damage in the package as well as desired; the packages are often cumbersome to handle and empty, which often resulted in disorganized or damaged strands after removal, especially when being used on automatic machines; the cost of packaging has been higher than desired due to package strength requirements; and easily manageable numbers, e.g., 50 strands per package, were difficult to obtain in a space efficient package.

BRIEF DESCRIPTION OF THE INVENTION

In accordance with the present invention, there is therefore provided a space efficient strand package which effectively protects the strands during transfer from larger containers, holding such packages, to casing stuffing apparatus; which package needs significantly reduced strength requirements and is therefore less costly; which is easy to handle; from which strands are easily removed without damage while maintaining good alignment of the strands with each other along their longitudinal axes.

In accordance with the present invention there is provided a package comprising, shirred, essentially cylindrically shaped, food casing strands, each of which has a strand diameter D. The strands are oriented in the package in such a way that longitudinal axes of the strands are parallel, external surfaces of the strands contact external surfaces of adjacent strands and ends of the strands terminate in approximately the same plane, which plane is perpendicular to the longitudinal axes of the strands. The strands are further oriented so that lines passing perpendicularly through the central axes of strands located proximate the external surface of the package intersect to form a hexagon in a plane perpendicular to the longitudinal axes. Sides of the hexagon have side lengths such that the lengths vary by no more than 1 D from each other. Strands, internally within the package, i.e. which would not have an exteriorly exposed surface if all package wraps were removed, contact six adjacent strands.

The package usually consists essentially of, n rows of strands and an external package retainer, usually a package wrap. Preferably each of the lines forming the hexagon passes through the central axes of either an equal number of strands or a number of strands which do not vary by more than one. Preferably, the package according to the present invention has an odd number of rows n, which is a number of 5 to 15.

BRIEF DESCRIPTION OF THE DRAWINGS

FIG. 5 shows a cross sectional view of a further alternative embodiment of the invention.

DETAILED DESCRIPTION OF THE INVENTION

Figure 1:
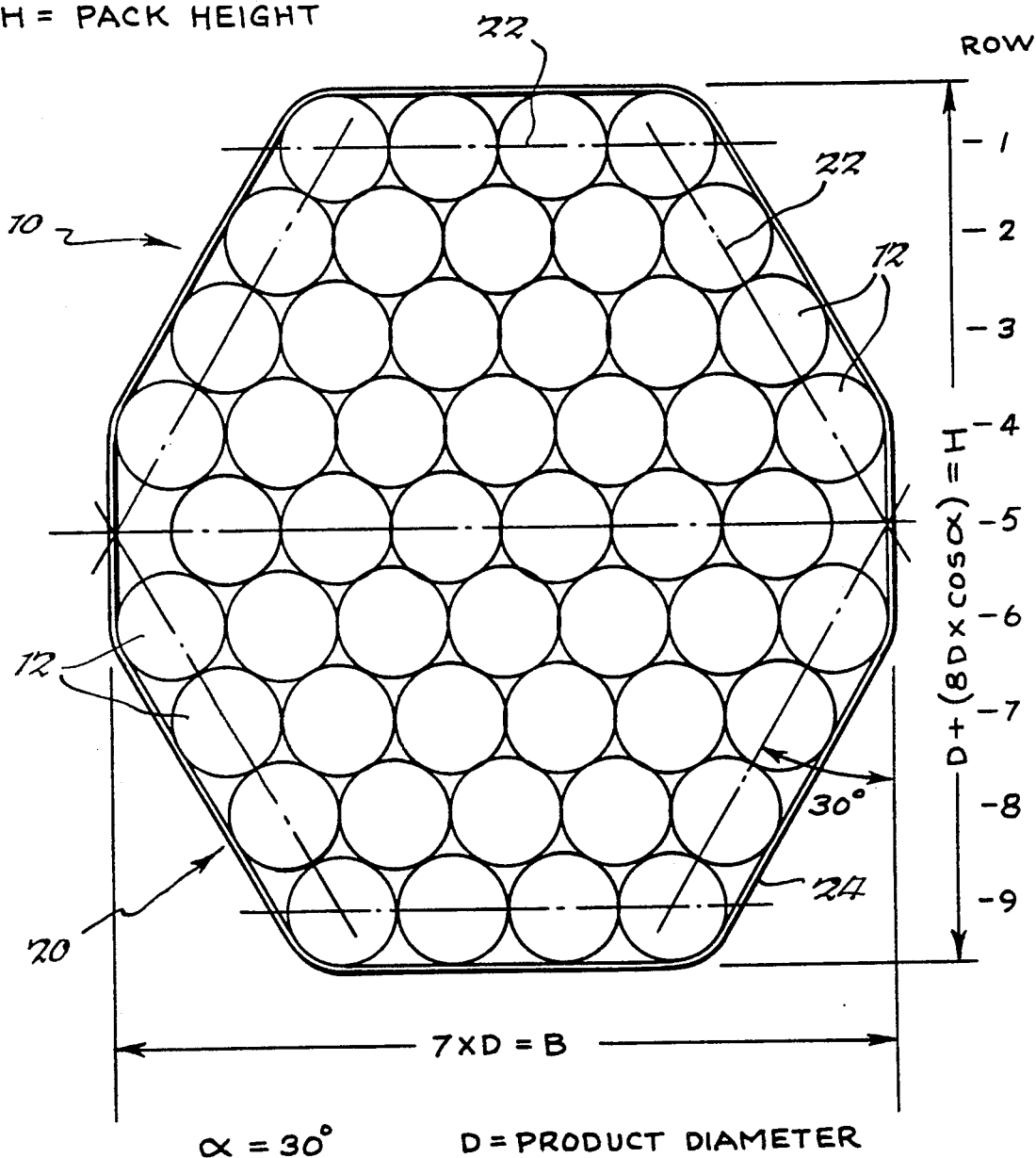
FIG. 1 shows an end view of a preferred embodiment of the package of the invention.

In accordance with a preferred embodiment of the present invention n is an odd number of rows and row number $(n/2)+\frac{1}{2}$ contains one strand less than row number $(n/2)-\frac{1}{2}$.

Further, in a preferred embodiment, the number of strands in rows 1 and $n=(n/2)-\frac{1}{2}$ or $(n/2)+\frac{1}{2}$ and the number of strands in center row number $(n/2)+\frac{1}{2}=n-3$ or $n-2$ and is one less than the number of strands in row number $(n/2)-\frac{1}{2}$.

The shirred casings within the product are most commonly used to package food, e.g., sausages in the form of hot dogs, salami, bologna, etc. Such casings are also commonly used to package lunch meats such as composite pressed ham and products such as cheeses. By shirred strand is meant a tubular casing product which has been folded or pleated in such a way that it has been compressed along its longitudinal axis to from one fiftieth (1/50) to one two hundredth (1/200) of its unshirred length and usually to one sixtieth (1/60) to one one hundred twenty fifth (1/125) of its unshirred length.

The shirred casing strands may be of any food casing material, e.g., regenerated cellulose, collagen, or fibrous, i.e., regenerated cellulose impregnated paper. As can be seen in the figures, the shirred food casing strands 12, are essentially cylindrical in shape and are oriented in the package 10 such that longitudinal axes 14 of the strands 12 are parallel within the package. External surfaces 16 of the strands contact external surfaces of adjacent strands and when a strand is entirely embedded within the package, the external surface of the strand contacts six adjacent strands in a stable space efficient configuration. Ends 18 of the strands terminate in a plane 20 perpendicular to the longitudinal axes 14 of strands 12. Such a plane may be considered as represented by FIG. 1.

The package has a retaining means, usually a package wrap, for securing the strands within the package in the previously described orientation. The package wrap may be of any suitable material, e.g. plastic film, for retaining the strand orientation and for protecting the strands.

Figure 2:
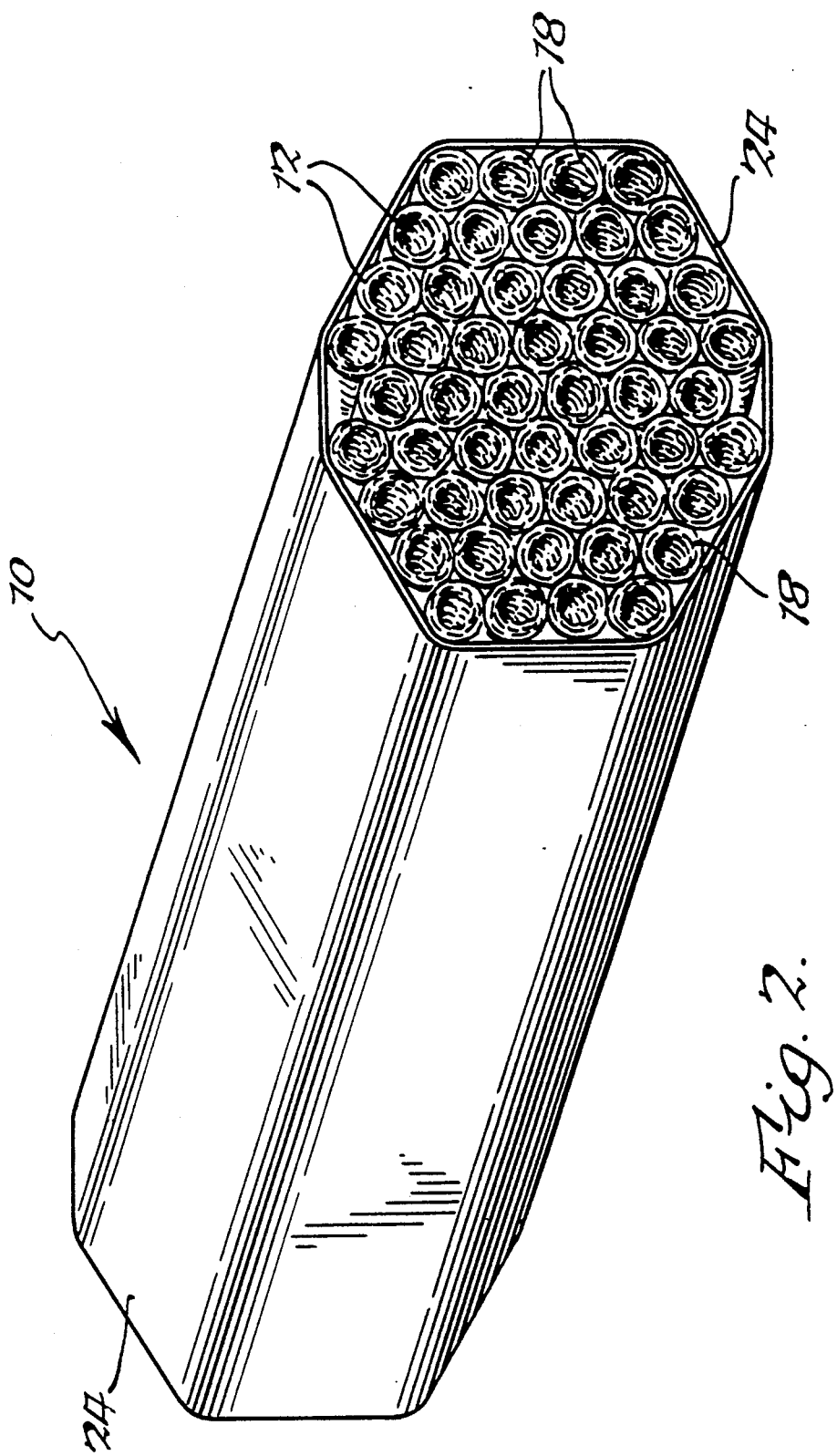
FIG. 2 shows the same package as FIG. 1 in a perspective view.
Figure 3:
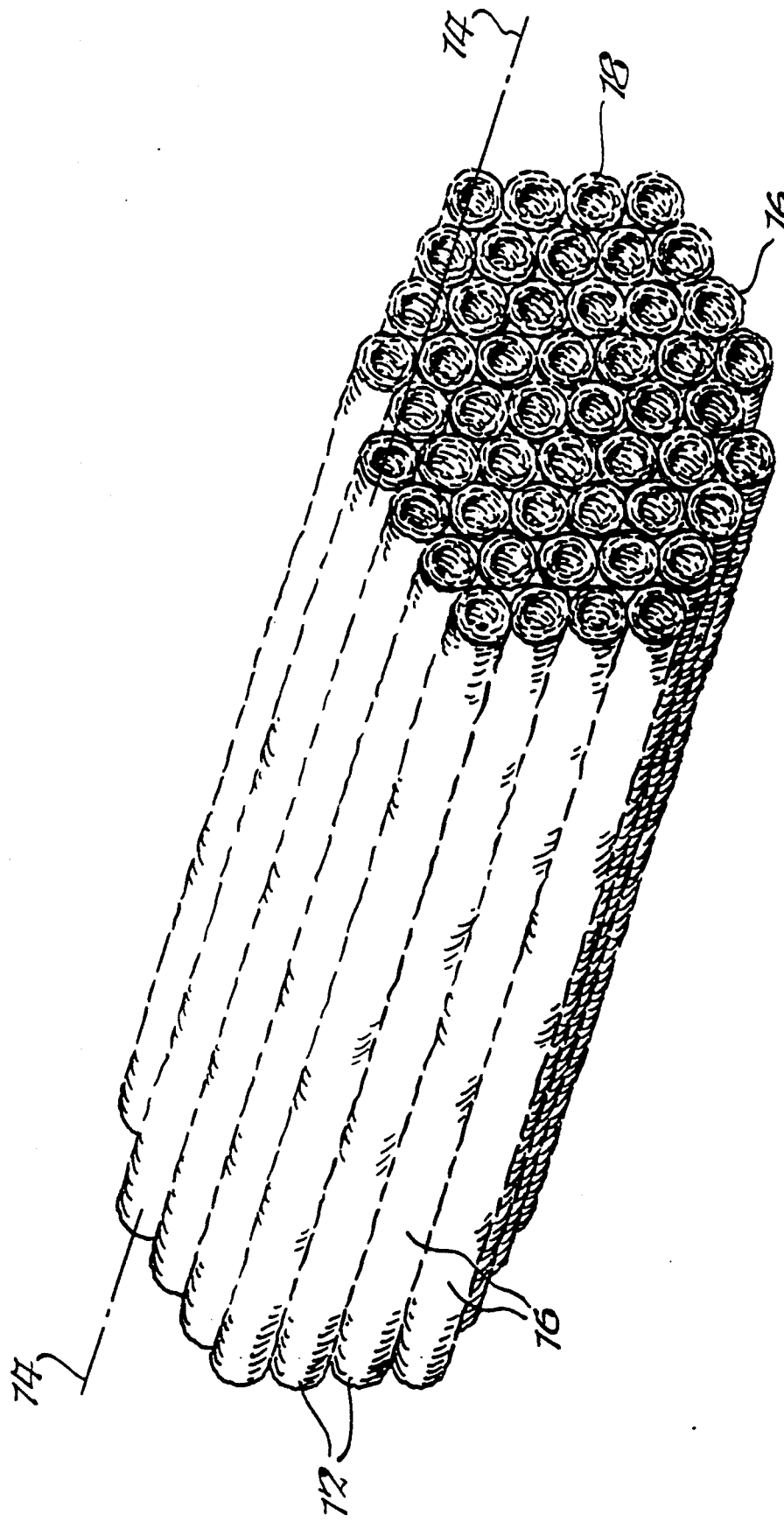
FIG. 3 is the perspective view of FIG. 2 with the wrap removed.

As shown in FIGS. 1-3 which illustrate a 50 strand preferred embodiment of the invention, a package 10 is provided which comprises 50 strands 12, of a shirred casing product.

As seen in FIG. 1, lines 22 passing through the longitudinal axes of strands 12 intersect to form a hexagon. The package width B, as shown in FIG. 1 may be represented by seven times the diameter of the strands and package height H may be $$H = D + (8D \times \cos \alpha)$$

where, as shown in FIG. 1, $\alpha = 30°$, H = height, D = the strand diameter.

As seen in the drawings, with respect to the nine row package, especially FIG. 1, the strands within the package are organized into nine strand rows. The first and ninth rows contain four strands, the second and eighth rows contain five strands, the third and seventh rows contain six strands, the fourth and sixth rows contain seven strands and the fifth row, also being the center row, contains six strands.

It may be noted that the number of strands in row number $(n/2) + \frac{1}{2}$, i.e. row number $(9/2) + \frac{1}{2}$ = row number 5 contains six strands which is one strand less than the seven strands contained in row number $(n/2) - \frac{1}{2}$, i.e. row number 4.

Further it may be noted that the number of strands in rows 1 and n, i.e. 1 and $9 = (n/2) - \frac{1}{2} = 9/2 - \frac{1}{2} = 4$ strands.

Further the number of strands in center row number $(n/2) + \frac{1}{2}$ i.e. $(9/2) + \frac{1}{2} = 5$ is $n - 3$, i.e. 6 strands.

Figure 4:
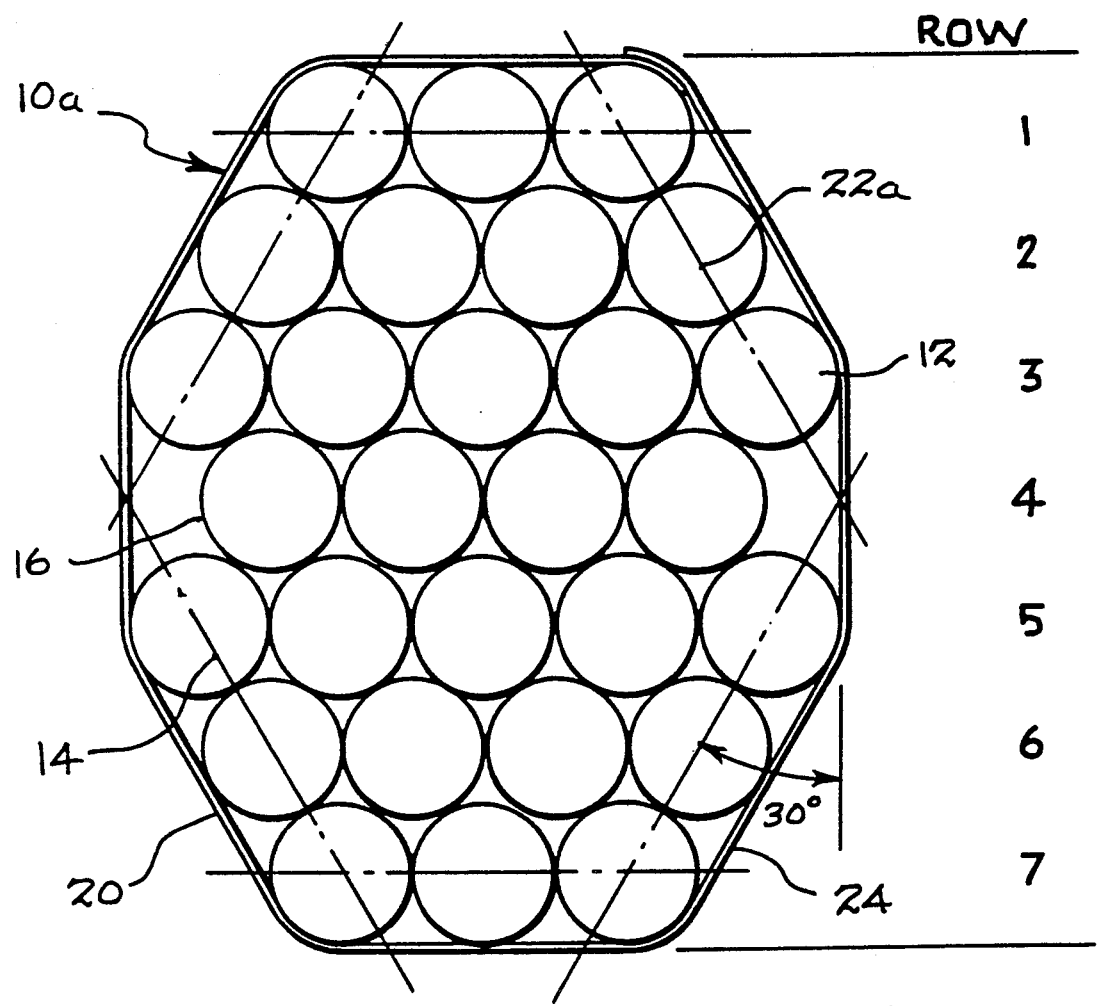
FIG. 4 shows a cross sectional view of an alternative embodiment of the invention.

In a further preferred embodiment as shown in FIG. 4, strand package 10a contains 28 strands and has seven rows.

The strands 12 are in cylindrical shape and are oriented in the package 10a such that longitudinal axes 14 of strands 12 are parallel within the package. Again external surfaces 16 of the strands contact external surfaces of adjacent strands and when a strand is entirely embedded within the package it contacts six adjacent strands. Lines 22a passing through the longitudinal axes of strands 12 intersect to form a hexagon.

The package width B may be represented by six times the strand diameter D and the package height may be represented by the formula $H = D + (6D \times \cos \alpha)$ where $\alpha = 30°$, H = height and D = strand diameter.

In general, for packages of the preferred embodiments of the present invention, where the lines pass through an equal number of strands, package width $B = (n - 2)D$ and where the lines in rows 1 and n pass through one more strand than the remaining lines $B = (n - 1)D$. Package height $H = D + (n - 1)D \cos \alpha$, where n = the number of rows in the package.

Again with respect to the embodiment shown in FIG. 4, the number of strands in row number $(n/2) + \frac{1}{2}$, i.e. 4 strands is one strand less than the number of strands in row number $(n/2) - \frac{1}{2}$, i.e. 5 strands. The number of strands in rows 1 and n, i.e. 1 and 7, $= (n/2) - \frac{1}{2} = ((7/2) - \frac{1}{2}) = 3$. And the number of strands in center row $(n/2) + \frac{1}{2} = n - 3$, i.e. row number four contains $7 - 3 =$ four strands.

A further embodiment is shown in FIG. 5 wherein the package has n = seven rows and rows 1 and n each have $(n/2) + \frac{1}{2}$ strands and the number of strands in row $(n/2) + \frac{1}{2} = n - 2$.

The package, as seen in FIGS. 1, 2, 4 and 5 has an external retaining means 24 which provides radial pressure to hold the strand package together. The retaining means is usually a wrap of paper or plastic film which simultaneously provides protection for the strands, but may also be another form of retaining means, such as a net or bands.

The ends of the package may optionally be sealed to provide moisture retention and the strand packages may be further packaged in a carton or other container in quantities of one or more. Two packages to a carton would, for example, provide 100 strands to a carton.

As can be readily seen, the strand package of the invention provides efficient packing of strands; is very stable, provides strand protection; utilizes very little packaging material in addition to the strands themselves; can be readily opened simply by removing the retaining means which allows removal from the package, for example within the hopper of an automated casing filling machine; yet, the cost of the package is relatively low when compared with previous packaging methods for shirred casing strands.

I claim:

1. A package comprising shirred essentially cylindrically shaped food casing strands, each of which has a strand diameter D, said strands being oriented in such package such that central longitudinal axes of the strands are parallel; external surfaces of the strands contact external surfaces of adjacent strands; ends of the strands terminate in approximately the same plane; said plane being perpendicular to the longitudinal axes of the strands, lines passing perpendicularly through the central axes of strands located proximate the external surface of the package intersect to form a hexagon; and strands internally within the package encompassed by adjacent strands contact six adjacent strands; the sides of said hexagon having side lengths such that said lengths vary by less than one D from each other, said package comprising an external package wrap and n rows of strands wherein n is an odd number of rows and row number $(n/2) + \frac{1}{2}$ contains one strand less than row number $(n/2) - \frac{1}{2}$.

2. The package of claim 1, wherein each of said lines passes through the central axes of an equal number of strands.

3. The package of claim 1, wherein the number of strands in rows 1 and $n = (n/2) - \frac{1}{2}$.

4. The package of claim 1, wherein the number of strands in rows 1 and $n = (n/2) + \frac{1}{2}$.

5. The package of claim 3, wherein the number of strands in row $(n/2) + \frac{1}{2} = n - 3$.

6. The package of claim 4, wherein the number of strands in row $(n/2) + \frac{1}{2} = n - 2$.

7. The package of claim 6, wherein the number of rows is seven and the package contains 35 strands.

* * * * *